3,083,163
ACETATE GREASES
Roger Perrus, Notre-Dame-de-Cravenchon, France, assignor to Esso Standard Societe Anonyme Francaise, Paris, France, a body corporate of France
No Drawing. Filed Jan. 18, 1960, Ser. No. 2,828
Claims priority, application France Feb. 20, 1959
12 Claims. (Cl. 252—42)

The inventon relates to grease compositions of improved properties, and which contain an auxiliary thickening copolymer.

Greases comprising base oils thickened to a grease consistency with one or more thickening agents, for example, soaps of organic acids are often found to be deficient in lubricating properties when employed under severe load and temperature conditions. Breakdown of the grease structure can occur, and the oil may be thrown off rapidly moving parts under centrifugal force. Similarly, such greases working under moist or watery conditions can absorb substantial quantities of water, resulting in loss of lubricity. It has now been discovered that greases comprising base oils thickened with one or more soaps of organic acids have their lubricating properties under severe conditions enhanced by incorporating therein minor proportions, for examples, 0.1%–5% by weight based on the total composition, particularly 0.5%–3% by weight, of an oil-soluble copolymer derived from at least two of the following ester monomers:

(1) An ester of an $\alpha$-$\beta$ unsaturated monocarboxylic acid and a $C_1$–$C_{20}$, preferably $C_8$–$C_{18}$, aliphatic alcohol.

(2) A diester of an $\alpha$-$\beta$ unsaturated dicarboxylic acid, e.g. maleic or fumaric acid, and a $C_1$–$C_{20}$, preferably $C_8$–$C_{18}$, aliphatic alcohol.

(3) A mono-ester of an $\alpha$-$\beta$ unsaturated dicarboxylic acid, e.g. fumaric or maleic acid, or the anhydride thereof, with a $C_1$–$C_{20}$, preferably $C_8$–$C_{18}$ aliphatic alcohol.

(4) A mono-ester of an $\alpha$-$\beta$ unsaturated dicarboxylated acid, e.g. fumaric or maleic acid, or the anhydride thereof, with a $C_1$–$C_{20}$, preferably $C_8$–$C_{18}$ aliphatic alcohol, and in which the remaining carboxyl group of the partial ester has been reacted with a $C_2$–$C_6$ alkylene oxide, particularly ethylene or propylene oxide. The degree of alkoxylation preferably ranges from 1–30 units of alkylene oxide per carboxyl group.

(5) An ester of an unsaturated alcohol containing a vinyl group and a $C_1$–$C_6$ monocarboxylic acid. A typical ester of this type is vinyl acetate.

The acid and alcohol groups from which the above ester groups are derived may contain one or more alkyl, aryl, sulphydril, amino or hydroxy substituent groups.

The copolymers derived from the above ester monomers may also contain residues derived from ethylenic hydrocarbon monomers, e.g. styrene, or unsaturated nitriles, such as acrylonitrile.

Examples of copolymers which are particularly useful in the compositions of this invention are those derived from at least two esters of fumaric acid and a mixture of $C_8$–$C_{10}$ natural alcohols, or a mixture of $C_{16}$–$C_{18}$ natural alcohols, mono-esters of maleic acid with such alcohols in which the remaining acid groups are alkoxylated with from 5–20 units of ethylene oxide, or vinyl acetate.

The copolymers incorporated in the compositions of this invention must be soluble in the base oil in the proportions used. Such solubility is determined by the nature of the base oil, which may be an oil of animal, vegetable or mineral origin, or it may be a synthetic oil, for example, an oxidized mineral oil or an ester-based oil. The oil solubility will also depend on the structure of the monomers and the final molecular weight of the copolymer additive products. Usually the copolymers which are found particularly useful as those with molecular weights between 50,000 and 200,000, particularly between 100,000 and 120,000.

The copolymers are obtained by normal chemical radiation or physical methods of polymerization from the aforementioned monomers, for instance, under catalytic conditions, using as catalyst peroxides, perbenzoates, Friedel-Crafts catalysts, or using the effects of pressure, radiation or temperature.

The above copolymers may be incorporated in any grease, i.e. a base oil thickened to a grease consistency with one or more gelling agents. Such agents may be organic thickeners such as carbon black, hydrocarbon polymers, activated clays or silicas, or mixtures thereof, or they may comprise one or more soaps of organic acids.

In particular, alkali or alkaline-earth soaps of fatty acids are widely used as grease thickening agents, including soaps of saturated or unsaturated $C_8$–$C_{40}$ fatty acids derived from animal, vegetable or synthetic fatty acids, including hydroxy acids. Sodium, calcium and lithium soaps of stearic, palmitic, oleic, linoleic and ricinoleicacid are particularly useful.

Other grease thickening agents used in the compositions of this invention can be complexes derived from the soaps of high molecular weight carboxylic acids containing more than 6, e.g. 7 to 20 carbon atoms per molecule, and the salts of lower molecular weight carboxylic acids containing from 1 to 6 carbon atoms per molecule. For carboxylic acids are preferably saturated aliphatic monocarboxylic acids.

The salt/soap complexes preferably contain at least 5 mols. (e.g. 8 to 25 mols.) of low molecular weight salt per mol. of high molecular weight soap. The complexes may be derived from metals of groups 1, 2 and 4 of the periodic classification of elements, and the metal constituent of the salt may be the same as or different from the metal constituent of the soap. Suitable metals are alkaline or alkaline earth, or heavier metals, particularly lithium and calcium. Particularly suitable salt/soap complexes are derived from calcium acetate and the calcium soaps of coconut fatty acids, (i.e. a mixture of $C_8$ and $C_{18}$ fatty acids), or the soap of capric acid.

The proportions of complex used are those sufficient to thicken the base oil to the required grease consistency. Thus typical compositions of the preferred embodiment of this invention consists of 96% to 68% of base oil, 3% to 30% of salt/soap complex and 0.1% to 30% of copolymer as hereinbefore described, all percentages being by weight.

The base oil is preferably a mineral lubricating oil of viscosity at 100° F. ranging from 15 to 435 centistokes, preferably 18 to 220 centistokes, and having a viscosity index of from 0 to 160, preferably higher than 50.

The soap/salt complexes can be prepared by heating a solution of the preferred soaps, or the high and lower molecular weight acids plus metal base, in a base oil and dehydrating at temperatures of 450° F. and above, and then incorporating in the base oil for the grease in the required proportions. Alternatively the grease compositions containing the salt/soap complexes may be obtained by first dispersing the copolymer, the preferred metal salt and saponification agent in the base oil, and heating to about 120° F., and adding the high molecular weight acid. Heating is continued to dehydrate the mixture, the resulting composition being run out into cakes, and thereafter homogenized.

When using soap/salt complex thickeners, the use of copolymer auxiliary thickeners enables a reduction in dehydration temperature when dehydration of the total composition takes place, as outlined above. Without the copolymer, dehydration temperatures of about 380–480° F. are required. In the presence of the copolymer however, the dehydration temperature can be lowered to about 260–285° F.

The composition of this invention can contain further conventional grease additives, for instance, extreme-pressure additives, anti-corrosion agents, dispersants and tackiness agents.

This invention is illustrated by the following examples. Firstly, a series of greases were made from a paraffinic base oil of viscosity index 115 and viscosity/210° F. of 5.1 cs. thickened to a grease consistency with sodium stearate, and containing various copolymers according to this invention, and derived from vinyl acetate, alkyl fumarates, and/or ethoxy alkyl maleates.

The ethoxy alkyl maleates were obtained by reaction between maleic anhydride and the corresponding alkanol, then adding one mol of ethylene oxide per mol of mono-ester in the presence of 0.1% by weight of soda as catalyst and finally by continuing to fix the ethylene oxide on the mols of monoester, in the presence of a boron fluoride ether complex as catalyst.

These ethoxylated esters, whether or not mixed with non-ethoxylated fumarates, were copolymerised with vinyl acetate in the presence of 1% by weight of benzoyl peroxide.

By altering the nature and proportions of the constituents to be copolymerised, the following copolymers were obtained:

*Table I*

|  | A | B | C | D | E |
|---|---|---|---|---|---|
| Composition of polymerised charge (percent by weight): | | | | | |
| Fumarate of natural alcohol: C₈/C₁₀ | 30 | 20 | | 10 | 60 |
| Fumarate of natural alcohol: C₁₀/C₁₃ | 40 | 40 | 40 | 30 | 20 |
| Monomaleate of natural alcohol C₈/C₁₀ with 10 mols ethylene oxide | 10 | 20 | 40 | 30 | |
| Monomaleate of natural alcohol C₈/C₁₀ with 5 mols ethylene oxide | | | | | |
| Monomaleate of natural alcohol C₈/C₁₀ with 20 mols ethylene oxide | | | | | |
| Vinyl acetate | 20 | 20 | 20 | 20 | 20 |
| Characteristics of the copolymer: | | | | | |
| Appearance | Liq. | Liq. | Liq. | Liq. | Liq. |
| Viscosity at 100° F. in cs. | 274 | 67.2 | 96.1 | 84.5 | 800 |
| Molecular mass (in thousands) | 120 | 60 | 80 | 70 | 180 |

For preparing the actual greases, the method of operation employed may be based on a traditional process termed "pan cooling." It consists of charging all the ingredients in a pan, eliminating the water, heating up to the melting point of the mass at about 400° F. The mass is then run on to dishes and, after cooling, the cakes of grease are mixed and homogenized. When additives are used, they are added just before pouring the grease onto the dishes.

The stability in respect of mechanical stress of the greases thus obtained has been appreciated by comparison with the ASTM penetration at 77° F. of the unworked grease and the worked grease (60 strokes).

The following table shows the characteristics of these greases and the result of the practical tests compared with those obtained with a grease containing no additive according to the invention.

*Table II*

|  | 1 | 2 | 3 | 4 | 5 | 6 |
|---|---|---|---|---|---|---|
| Composition of grease in percent by weight: | | | | | | |
| Base oil | 82.52 | 82.22 | 81.52 | 82.22 | 81.52 | 80.52 |
| Soda | 2.48 | 2.48 | 2.48 | 2.48 | 2.48 | 2.48 |
| Stearic acid | 15 | 15 | 15 | 15 | 15 | 15 |
| Copolymer: | | | | | | |
| A | | 0.3 | 1 | | | |
| B | | | | | | |
| C | | | | | | |
| D | | | | 0.3 | 1 | |
| E | | | | | | 2 |
| Dehydrating temperature, °F. | 390 | 390 | 390 | 390 | 390 | 390 |
| Pour point of grease, °F. | 302 | 323 | 331 | 320 | 350 | 302 |
| Stability in respect of mechanical stress: | | | | | | |
| ASTM penetration at 77° F. unworked | 230 | 223 | 187 | 220 | 210 | 225 |
| Worked 60 strokes | 320 | 273 | 208 | 238 | 240 | 300 |

A second series of greases were prepared using a similar base oil to that used in the first series, but thickened to a grease consistency with salt/soap complexes comprising calcium acetate and calcium caprylate, and containing copolymers according to this invention derived from vinyl acetate, alkyl fumarates and/or alkoxylated alkyl maleates.

The ethoxylated alkyl maleates were obtained by a reaction between maleic anhydride and the corresponding alkanol, then adding one mol of ethylene oxide per mol of mono-ester in the presence of 0.1% by weight of soda as catalyst, and finally, by continuing to fix the ethylene oxide on to the moles of mono-ester, in the presence of the boron fluoride-ether complex as catalyst.

These ethoxy esters, mixed or not with non-ethoxylated fumarates, were copolymerised with vinyl acetate in the presence of 1% by weight of benzoyl peroxide.

By altering the nature and the proportions of the constituent to be copolymerised, the following copolymers were obtained (see Table III).

For preparing actual greases, the base oil, the lime and if necessary the copolymer were placed in a container. Heat was applied after dispersing the lime by stirring. At about 122° F. the fatty acid was added, while continuing to heat. When the temperature has reached 158° F. the acetic acid was added. The temperature was then gradually raised to 266–275° F. and kept there for two hours. In the case of the preparation of a grease containing no copolymer it is necessary, as already stated, to carry out dehydration at about 480° F.

Various greases were thus obtained whose:

Heat stability is assessed according to the pour point,

Stability in respect of mechanical stress has been appreciated by comparison of the ASTM penetration at 77° F. of the unworked grease and of the worked grease (60 strokes), Resistance to water was appreciated according to the so-called "water washout test" by the ASTM method D 1264–53T, consisting of rotating a bearing filled with grease at 600 r.p.m. for one hour under a jet of water. At the end of the test, the bearing is dried in a drying closet at 176° F. for 16 hours, after which the quantity of grease carried by the water out of the bearing is determined by weighing.

Table III

| | Copolymers | | | | | | | |
|---|---|---|---|---|---|---|---|---|
| | A | B | C | D | E | F | G | H |
| Composition of the polymerized charge (percent by weight): | | | | | | | | |
| Fumarate of natural $C_8/C_{10}$ alcohol | 30 | 20 | | 10 | 10 | 30 | | 60 |
| Fumarate of natural $C_{16}/C_{18}$ alcohol | 40 | 40 | 40 | 30 | 40 | 40 | 40 | 20 |
| Monomaleate of natural $C_8/C_{10}$ alcohol with 10 mols ethylene oxide | 10 | 20 | 40 | 30 | | | | |
| Monomaleate of natural $C_8/C_{10}$ alcohol with 5 mols ethylene oxide | | | | | 30 | | | |
| Monomaleate of natural $C_8/C_{10}$ alcohol with 20 mols ethylene oxide | | | | | | 10 | 40 | |
| Vinyl acetate | 20 | 20 | 20 | 20 | 20 | 20 | 20 | 20 |
| Characteristics of the copolymer: | | | | | | | | |
| Appearance | Liq. | Liq. | Liq. | Liq. | Liq. | Liq. | Liq. | Liq. |
| Viscosity at 210° F in cs | 174 | 67.2 | 96.1 | 84.5 | 88.8 | 166.4 | 34 | 800 |
| Molecular mass (in thousands) | 120 | 60 | 80 | 70 | 70 | 100 | 40 | 180 |

Moreover, resistance to water was assessed by mixing equal weights of grease and water. Resistance to water is better the more difficult the emulsion is in forming and the faster the water/grease separation once mixing is halted.

Table IV shows the characteristics of the greases prepared as indicated above, their stability in respect of mechanical working and their resistance to water, these characteristics being compared with those obtained with a grease containing no added copolymer according to the invention.

3. A grease composition according to claim 1 wherein said oil-soluble copolymer is formed by polymerizing 0 to 30 wt. percent of alkyl fumarate wherein said alkyl radicals are derived from natural $C_8$ to $C_{10}$ alkanols, 30 to 40 wt. percent of alkyl fumarate wherein said alkyl radicals are derived from natural $C_{16}$ to $C_{18}$ alkanols, 10 to 40 wt. percent of a maleate wherein one carboxy group has been esterified with an alkyl radical derived from natural $C_8$ to $C_{10}$ alkanols and wherein the remaining carboxyl group has been reacted with from 5 to 20 moles of ethylene oxide, and the balance being vinyl acetate.

Table IV

| | 1 | 2 | 3 | 4 | 5 | 6 | 7 | 8 | 9 | 10 | 11 |
|---|---|---|---|---|---|---|---|---|---|---|---|
| Composition of grease (percent by weight): | | | | | | | | | | | |
| Basic oil | 73 | 72 | 72 | 70 | 72 | 70 | 70 | 70 | 72 | 72 | 70 |
| Lime | 9 | 9 | 9 | 9 | 9 | 9 | 9 | 9 | 9 | 9 | 9 |
| Acetic acid | 12 | 12 | 12 | 12 | 12 | 12 | 12 | 12 | 12 | 12 | 12 |
| $C_6$ fatty acid | 6 | 6 | 6 | 6 | 6 | 6 | 6 | 6 | 6 | 6 | 6 |
| Copolymers: | | | | | | | | | | | |
| A | | 1 | | | | | | | | | |
| B | | | | | | | | | | | |
| C | | | 1 | 3 | | | | | | | |
| D | | | | | 1 | 3 | | | | | |
| E | | | | | | | 3 | | | | |
| F | | | | | | | | 3 | | | |
| G | | | | | | | | | 1 | | |
| H | | | | | | | | | | 1 | 3 |
| Dehydrating temperature, ° F | 482 | 275 | 275 | 275 | 275 | 275 | 275 | 275 | 275 | 275 | 275 |
| Pour point, ° F | 93 | 93 | 93 | 93 | 93 | 93 | 93 | 93 | 93 | 93 | 93 |
| Stability in respect of mechanical working: ASTM penetration at 77° F: | | | | | | | | | | | |
| Unworked | 380 | 351 | 316 | 318 | 334 | 316 | 290 | 296 | 280 | 262 | 327 |
| Worked 60 strokes | 400 | 384 | 342 | 332 | 337 | 323 | 314 | 317 | 282 | 282 | 377 |
| Resistance to water: percent losses in water washout test | 20 | 5 | 0 | 0 | 4.5 | 3 | 9.5 | 4 | 5 | 5 | 10 |
| Behaviour of grease mixed with its weight of water | Bad | Good | Good | Good | Good | Good | Good | Bad | Good | Bad | Good |

What is claimed is:
1. A grease composition comprising a base oil thickened to grease consistency with a thickener selected from the group consisting of inorganic thickeners and organic thickeners and containing 0.1 to 5 wt. percent of an oil-soluble copolymer wherein said oil-soluble copolymer is formed by polymerizing a feed mixture comprising from 40 to 70 wt. percent of the diester derived from an α-β unsaturated dicarboxylic acid and a $C_1$-$C_{20}$ aliphatic alcohol, from 10 to 40 wt. percent of the diester derived from an α-β unsaturated dicarboxylic acid wherein one carboxy group has been esterified with a $C_1$-$C_{20}$ aliphatic alcohol and wherein the remaining carboxyl group has been reacted with from 1 to 30 moles of a $C_2$-$C_6$ alkylene oxide and the balance of said feed mixture being the ester of an unsaturated alcohol having a vinyl group and a $C_1$ to $C_6$ monocarboxylic acid.

2. A grease composition according to claim 1 wherein said α-β unsaturated dicarboxylic acid is selected from the group consisting of fumaric acid and maleic acid and said ester of an unsaturated alcohol having a vinyl group and a monocarboxylic acid is vinyl acetate.

4. A grease composition according to claim 1 wherein said oil-soluble copolymer is formed by polymerizing about 30 wt. percent of alkyl fumarate, wherein said alkyl radicals are derived from natural $C_8$ to $C_{10}$ alkanols, about 40 wt. percent of alkyl fumarate wherein said alkyl radicals are derived from natural $C_{16}$ to $C_{18}$ alkanols, about 10 wt. percent of a maleate wherein one carboxy group has been esterified with an alkyl radicals derived from natural $C_8$ to $C_{10}$ alkanols and wherein the remaining carboxyl group has been reacted with from 5 to 20 moles of ethylene oxide, and about 20 wt. percent of vinyl acetate.

5. A grease composition according to claim 1 wherein said oil-soluble copolymer is formed by polymerizing about 20 wt. percent of alkyl fumarate wherein said alkyl radicals are derived from natural $C_8$ to $C_{10}$ alkanols, about 40 wt. percent of alkyl fumarate wherein said alkyl radicals are derived from natural $C_{16}$ to $C_{18}$ alkanols, about 20 wt. percent of a maleate wherein one carboxy group has been esterified with an alkyl radical derived from natrual $C_8$ to $C_{10}$ alkanols and wherein the remaining carboxyl group has been reacted with from 5 to 20 moles of ethylene oxide, and about 20 wt. percent of vinyl acetate.

6. A grease composition according to claim 1 wherein said oil-soluble copolymer is formed by polymerizing about 40 wt. percent of alkyl fumarate wherein said alkyl radicals are derived from natural $C_{16}$ to $C_{18}$ alkanols, about 40 wt. percent of a maleate wherein one carboxy group has been esterified with an alkyl radical derived from natural $C_8$ to $C_{10}$ alkanols and wherein the remaining carboxyl group has been reacted with from 5 to 20 moles of ethylene oxide, and about 20 wt. percent of vinyl acetate.

7. A grease composition according to claim 1 wherein said oil soluble copolymer is formed by polymerizing about 10 wt. percent of alkyl fumarate wherein said alkyl radicals are derived from natural $C_8$ to $C_{10}$ alkanols, about 30 wt. percent of alkyl fumarate wherein said alkyl radicals are derived from natural $C_{16}$ to $C_{18}$ alkanols, about 30 wt. percent of a maleate wherein one carboxy group has been esterified with an alkyl radical derived from natural $C_8$ to $C_{10}$ alkanols and wherein the remaining carboxyl group has been reacted with from 5 to 20 moles of ethylene oxide and about 20 wt. percent of vinyl acetate.

8. A grease composition according to claim 1 wherein said oil soluble copolymer is formed by polymerizing about 10 wt. percent of alkyl fumarate wherein said alkyl radicals are derived from natural $C_8$ to $C_{10}$ alkanols, about 40 wt. percent of alkyl fumarate wherein said alkyl radicals are derived from natural $C_{16}$ to $C_{18}$ alkanols, about 30 wt. percent of a maleate wherein one carboxy group has been esterified with an alkyl radical derived from natural $C_8$ to $C_{10}$ alkanols and wherein the remaining carboxyl group has been reacted with from 5 to 20 moles of ethylene oxide, and about 20 wt. percent of vinyl acetate.

9. A grease composition according to claim 1 wherein said oil soluble copolymer is formed by polymerizing about 40 wt. percent of alkyl fumarate wherein said alkyl radicals are derived from natural $C_{16}$ to $C_{18}$ alkanols, about 40 wt. percent of a maleate wherein one carboxy group has been esterified with an alkyl radical derived from natural $C_8$ to $C_{10}$ alkanols and wherein the remaining carboxyl group has been reacted with from 5 to 20 moles of ethylene oxide, and about 20 wt. percent of vinyl acetate.

10. A grease composition according to claim 2 which is thickened to a grease consistency with a complex derived from the metal soap of a high molecular weight carboxylic acid containing more than 6 carbon atoms per molecule and a metal salt of a $C_1$ to $C_6$ carboxylic acid.

11. A grease composition according to claim 10 in which said complex is derived from a metal salt of acetic acid wherein said metal is selected from the group consisting of alkali metals and alkaline earth metals and a metal soap of a $C_8$ to $C_{20}$ aliphatic monocarboxylic acid wherein said metal is selected from the group consisting of alkali metal and alkaline earth metals.

12. A grease composition according to claim 11 wherein said complex is derived from at least 5 molecules of said metal salt of acetic acid per molecule of said soap.

References Cited in the file of this patent

UNITED STATES PATENTS

| | | |
|---|---|---|
| 2,846,392 | Morway et al. | Aug. 5, 1958 |
| 2,936,300 | Tutwiler et al. | May 10, 1960 |